United States Patent Office 2,959,557
Patented Nov. 8, 1960

2,959,557
PREPARATION OF BASIC METAL FLUORIDES

Rowland C. Hansford, Fullerton, Calif., assignor to Union Oil Company of California, Los Angeles, Calif., a corporation of California No Drawing. Filed May 13, 1957, Ser. No. 658,511

11 Claims. (Cl. 252—442)

This invention relates to new methods for the preparation of basic fluorides of certain polyvalent metals, i.e. aluminum, zirconium, and titanium. The resulting compounds are hydroxyfluorides containing a predetermined ratio of fluoride to hydroxyl groups. Briefly, the new method comprises first preparing an alkoxide of the desired metal, e.g. aluminum isopropoxide, and then hydrolyzing the alkoxide in an aqueous solution of hydrofluoric acid. By suitably adjusting the amount of hydrofluoric acid used, the desired ratio of fluoride to hydroxyl groups is obtained.

The basic fluorides of this invention are useful as catalysts for hydrocarbon conversions, for example cracking, isomerization, polymerization of olefins, and the like. They may also be employed for alkylation, i.e. the alkylation of isoparaffins with olefins, or aromatics with olefins. They are also useful catalyst supports on which may be distended other catalytic materials, e.g. hydrogenating components comprising transitional metals such as nickel, platinum, cobalt, molybdenum, chromium and the like, or their oxides or sulfides. The supported catalysts are useful in a variety of hydrocarbon treatments involving hydrogenation, as for example reforming, desulfurization, denitrogenation, hydrocracking and the like. In all these cases the acidic nature of the catalyst or the support promotes those reactions which proceed through the mechanism of carbonium ions.

The principal object of the invention is to provide convenient and inexpensive methods for preparing basic fluorides of predetermined and chemically uniform composition. A further object is to avoid the introduction of undesired extraneous ions into the final composition. A broader object is to provide a new class of acidic catalysts for hydrocarbon conversions. Other objects will be apparent from the more detailed description which follows.

It is well known to add a fluoride such as hydrogen fluoride or ammonium fluoride to a support such as alumina, or aluminum hydroxide, to increase the acidic function thereof. Such carriers are well known as supports for platinum reforming catalysts. Generally, only small amounts of fluorine are added, e.g. 0.5% to 1.0%. Conventional methods of adding fluorine to alumina are believed to result preferentially in the formation of the normal trifluoride, with minor proportions of basic fluorides. Such mixtures of basic and normal fluorides cannot be readily separated into the pure components.

It is also known to use substantially pure fluorides, e.g. aluminum fluoride, as a catalyst or catalyst support. However, such fluoride supports are not satisfactory because of their very low surface area.

The basic fluorides of this invention are to be sharply distinguished from mixtures of normal fluorides and non-fluorinated oxides or hydroxides. X-ray diffraction analysis of the basic fluorides shows a characteristic crystalline structure corresponding to the structure of a true hydroxy-fluoride. No normal oxides, hydroxides or fluorides can be detected, as is the case with mere mechanical mixtures.

The basic fluorides are also sharply distinguished from mere hydrated fluorides, i.e. fluorides containing water of hydration, such as $AlF_3 \cdot nH_2O$. In the latter compounds, water is held by adsorption, and is largely removed by calcining. In the basic fluorides of this invention however, the hydroxyl groups are held by chemical combination, and are difficultly removed by calcining. Discrete compounds within the scope of this invention comprise the following:

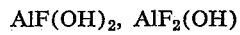
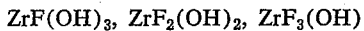
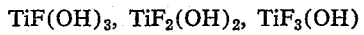

$AlF(OH)_2$, $AlF_2(OH)$ $ZrF(OH)_3$, $ZrF_2(OH)_2$, $ZrF_3(OH)$ $TiF(OH)_3$, $TiF_2(OH)_2$, $TiF_3(OH)$

Any of these compounds may contain additional water of hydration, depending upon the degree of drying to which they are subjected. The preferred compositions for catalytic purposes are those which contain a minor proportion of one of the above compounds in intimate admixture with the corresponding metal oxide.

Very little appears to be known concerning hydroxyfluorides (cf. A. F. Wells, "Structural Inorganic Chemistry," 2nd edition, Clarendon Press, 1950, page 312). Previously known methods for preparing the basic fluorides are difficult and cumbersome. Moreover, it is substantially impossible by conventional procedures to prepare them in a condition free of contaminating ions. For example, the method described by Cowley and Scott (J.A.C.S., 70, 105 (1948)), is said to yield a product containing ammonia in the form of ammonium hexafluoaluminate even after exhaustive washing and drying. By the process of this invention the basic fluorides are prepared in a simple and convenient manner, without leaving contaminating ions in the product.

It has further been found that the basic fluorides of this invention are stable compounds up to temperatures of 500° to 600° C.; i.e. they do not break down into oxides and normal fluorides below those temperatures. Moreover, it has been found that the calcined products still possess a considerable surface area, ranging up to about 350 square meters per gram.

The method of this invention is extremely simple. The general procedure involves mixing an alkoxide of the desired metal with aqueous hydrofluoric acid containing an amount of HF calculated to yield the desired proportion of fluorine in the finished product. In the case of aluminum fluorides, the calculated stoichiometric equivalent of hydrofluoric acid may be used. In the case of titanium and zirconium fluorides, especially the higher fluorides containing more than one fluorine atom per metal atom, it is necessary to use an excess of hydrofluoric acid over that theoretically required. About a 25 to 50% molar excess is required in most cases.

Ordinarily, it is preferable to add the metal alkoxide in the form of a solution in the corresponding alcohol, e.g. aluminum isopropoxide in isopropyl alcohol. However, the pure alkoxides may also be used. The reaction usually proceeds satisfactorily at room temperature, preferably with stirring. In some cases however it may be desirable to heat the solution to e.g. 75°–150° C. The strength of the hydrofluoric acid solution employed is not critical so long as sufficient water is present to provide the desired hydroxyl groups. For the sake of convenience it is preferable to use a large excess of water. The use of 0.5% to 10% hydrofluoric acid solutions is normally preferred.

The precipitate which is formed upon stirring the alkoxide into the acidic solution is then recovered by filtration, washed with water, drained, dried and heated to e.g. 200°–500° C. to expel water of hydration.

Any suitable alkoxide may be employed, for example the alkoxides of any one, or a mixture, of the aliphatic or cycloaliphatic alcohols having from one to ten carbon atoms. The alkoxides of methanol, ethanol, propanol, isopropanol, butanol, isobutanol, pentanol, hexanol, octanol, cyclohexanol, and the like are specifically contemplated. Specific examples of suitable alkoxides include the following: aluminum trimethoxide, aluminum triethoxide, aluminum triisopropoxide, aluminum tributoxide, aluminum tricyclohexoxide; zirconium tetramethoxide, zirconium tetraethoxide, zirconium tetraisopropoxide, zirconium tetraisobutoxide; titanium tetramethoxide, titanium tetraethoxide, titanium tetraisopropoxide, titanium tetraisobutoxide.

According to one specific modification, a highly polymeric basic fluoride may be prepared by acid hydrolysis of a metal alkoxide of a polyhydric alcohol. The alkoxides of the polyhydric alcohols are highly polymeric, and upon hydrolysis yield polymeric basic fluorides of extremely high surface area. Suitable polyhydric alcohols include the aliphatic or cycloaliphatic polyhydroxy compounds, containing from 2 to about 20 carbon atoms, and from 2 to about 6 hydroxyl groups. This includes in general the glycols, polyglycols, glycerol, glycerol monoethers, erythritol, erythritol ethers, pentaerythritol, pentaerythritol ethers, mannitol, mannitol ethers, sorbitol, sorbitol ethers, and the like. Suitable specific examples include ethylene glycol, 1,2-propylene glycol, 1,3-propylene glycol, 1,2-butylene glycol, 1,3-butylene glycol, 1,4-butylene glycol, the dihydroxy pentanes and hexanes, 1,4-cyclohexanediol, 1,3-cyclohexanediol, 1,2-cyclohexanediol, d-quercitol, i-inositol, diethylene glycol, triethylene glycol, tetraethylene glycol, di-1,2-propylene glycol, di-1,3-propylene glycol, glycerol monomethyl ether, glycerol monoethyl ether, glycerol monododecyl ether, etc. The preferred group of compounds are the lower polyhydroxy alkanes containing from 2 to 6 carbon atoms and from 2 to 4 hydroxyl groups.

The above polymeric alkoxides cannot be prepared by direct action of the metal upon the polyhydric alcohol. They may however be readily prepared by reacting an alkoxide of a monhydric alcohol, e.g. aluminum isopropoxide, with the polyhydric alcohol. The preparation and hydrolysis of such polymeric alkoxides is more particularly described in my co-pending application, Serial No. 625,601 filed December 3, 1956, now U.S. Patent No. 2,917,366.

The alkoxides of monomeric alcohols may be prepared by known methods, as for example the direct action of aluminum upon the alcohol in the presence of a catalyst such as mercuric salts, iodine, carbon tetrachloride and the like.

The following examples are cited to illustrate more specifically the preparation of the basic fluorides of this invention, but are not intended to be limiting in scope.

*Example I*

Fifty grams of aluminum isopropoxide was dissolved in 150 ml. of isopropyl alcohol. This solution was added slowly with stirring to 200 ml. of a 5% aqueous HF solution. Rapid hydrolysis and solution of the isopropoxide occurred during the first part of the addition. Near the end of the addition of the isopropoxide solution precipitation of a gelatinous material occurred. The final slurry was neutral. The precipitate was filtered off and dried at 110° C. X-ray diffraction of the dried product showed it to be crystalline, corresponding to the structure of a true hydroxy aluminum fluoride hydrate. No free alumina hydrates or aluminum fluoride could be detected. The composition corresponded to $Al(OH)F_2 \cdot nH_2O$.

The product was calcined under vacuum at successive temperature levels of 300°, 400°, and 500° C. The corresponding surface areas were 131, 129, and 115 square meters per gram.

*Example II*

A second preparation was made as described in Example I from 50 g. aluminum isopropoxide and 200 ml. of a 1.25% HF solution. The product, after calcination at 300° C., had a surface area of 346 square meters per gram. After calcination at 500° C., the surface area was 260 square meters per gram. By analysis the product was found to correspond to the composition, $$Al(OH)_{2.5}F_{0.5}$$

and was thus a 50/50 mixture of $Al(OH)_3$ and $Al(OH)_2F$. No $Al(OH)F_2$ was present.

*Example III*

A sample of a hydroxy titanium fluoride was prepared as follows: 60 grams of titanium tetra-isopropoxide was dissolved in 150 ml. of isopropyl alcohol. This solution was then added slowly with stirring to 200 ml. of a 4.2% aqueous hydrofluoric acid solution. The gelatinous precipitate was filtered off and dried at 110° C. The resulting product was found to correspond to the composition $Ti(OH)_{2.5}F_{1.5}$, and was thus a 50/50 mixture of $Ti(OH)_3F$ and $Ti(OH)_2F_2$. No $Ti(OH)_4$, $Ti(OH)F_3$ or $TiF_4$ was present. Upon calcining at 300° C., the resulting product was found to have an area of 22 square meters per gram.

When this experiment is repeated using 200 ml. of a 2.2% hydrofluoric acid solution, pure $Ti(OH)_3F$ is obtained.

*Example IV*

Example III is repeated using zirconium tetra-isopropoxide in place of the corresponding titanium alkoxide. A mixture of $Zr(OH)_3F$ and $Zr(OH)_2F_2$ is obtained, which is stable on calcining at 300° C. A 2.2% hydrofluoric acid solution gives pure $Zr(OH)_3F$.

*Example V*

Fifty grams of pure aluminum tri-isopropoxide is dissolved in 75 ml. of anhydrous isopropanol. To this solution is added, dropwise with stirring at room temperature, 25 ml. of dry ethylene glycol. Immediate precipitation takes place of the aluminum polyester of ethylene glycol as a heavy amorphous white solid. The polyester is recovered by filtration and is then stirred slowly into 200 ml. of a 5% aqueous hydrofluoric acid solution. Rapid hydrolysis takes place as indicated by a rise in temperature. The resulting product is recovered by filtration and upon drying and calcining at 500° C. is found to have a surface area in excess of the product produced in Example I. The chemical composition corresponds to $Al(OH)F_2 \cdot nH_2O$.

The catalyst of Example II may be used with excellent results in the cracking of gas oils at 875°–925° F. to produce good yields of gasoline. The catalyst may be used either in fluidized form, or it may be pressed into tablets and used in a moving, compact bed process. In either case, the feedstock is vaporized and contacted with the catalyst at the indicated temperatures, at a pressure of about 10–25 p.s.i.g., and catalyst/oil ratio of about 5/1. Gasoline yields of 25% to 40% by volume are typical.

By substituting other alkoxides in the foregoing examples, substantially similar results are obtained. By varying the ratio of hydrofluoric acid to aluminum, compositions of varying basicity (i.e. F/OH ratio) are readily obtained.

It is not intended that the invention should be restricted to the details disclosed in the foregoing examples or elsewhere herein, since many variations may be made by those skilled in the art without departing from the scope or spirit of the following claims, which are intended to delineate the true scope of the invention:

I claim:

1. A method for preparing a basic metal fluoride which comprises hydrolyzing a metal alkoxide with an aqueous hydrofluoric acid solution, and recovering the precipitated basic fluoride, said metal being selected from the class consisting of aluminum, titanium and zirconium.

2. A process as defined in claim 1 wherein said alkoxide is an aluminum alkoxide of a lower monohydric alcohol.

3. A process as defined in claim 1 wherein said alkoxide is an aluminum polyester of a polyhydric alcohol.

4. A process as defined in claim 1 wherein said aqueous hydrofluoric acid solution contains between about 0.5% and 10% by weight of HF.

5. A method for preparing a basic metal fluoride containing a predetermined ratio of hydroxyl and fluorine groups, which comprises mixing an alkoxide of said metal with sufficient of an aqueous hydrofluoric acid solution to provide the desired stoichiometric quantity of fluorine, and recovering the precipitated basic fluoride, said metal being selected from the class consisting of aluminum, titanium, and zirconium.

6. A process as defined in claim 5 where said alkoxide is an aluminum alkoxide of a lower monohydric alcohol.

7. A process as defined in claim 5 where said alkoxide is an aluminum polyester of a polyhydric alcohol.

8. A process as defined in claim 5 where said alkoxide is a zirconium alkoxide of a lower monohydric alcohol.

9. A process as defined in claim 5 where said alkoxide is a titanium alkoxide of a lower monohydric alcohol.

10. A process as defined in claim 5 wherein said aqueous hydrofluoric acid solution contains between about 0.5% and 10% by weight of HF.

11. A composition of matter having a high surface area and substantial catalytic cracking activity, which comprises a calcined intimate mixture of alumina hydrate and up to about 50% by weight of a basic aluminum fluoride, said mixture having been prepared by hydrolyzing an aluminum alkoxide with an aqueous hydrofluoric acid solution; said composition being substantially free of aluminum trifluoride.

References Cited in the file of this patent

UNITED STATES PATENTS

| | | |
|---|---|---|
| 2,412,371 | Teter | Dec. 10, 1946 |
| 2,413,868 | Frey | Jan. 7, 1947 |
| 2,415,716 | Feltman | Feb. 11, 1947 |
| 2,644,798 | Calfee | July 7, 1953 |